United States Patent [19]

Kimball et al.

[11] Patent Number: 4,721,203

[45] Date of Patent: Jan. 26, 1988

[54] POWERED ACCUMULATING CONVEYOR APPARATUS

[75] Inventors: Thomas Kimball, Toms River; Harold Pfeiffer, Forked River, both of N.J.

[73] Assignee: Unex Conveying Systems, Inc., Jackson, N.J.

[21] Appl. No.: 861,777

[22] Filed: May 9, 1986

[51] Int. Cl.$^4$ .................................................. B65G 13/06
[52] U.S. Cl. .................................................. 198/781
[58] Field of Search .................................. 198/781, 790

[56] References Cited

U.S. PATENT DOCUMENTS

| | | | |
|---|---|---|---|
| 1,728,538 | 9/1929 | Gentil et al. | 198/781 |
| 3,225,893 | 12/1965 | Currie | 198/781 |
| 3,323,636 | 6/1967 | Gotham | 198/790 |
| 3,355,008 | 11/1967 | Milazzo | 198/460 |
| 3,408,899 | 11/1968 | Golden | 92/99 |
| 3,537,568 | 11/1970 | Leach | 198/781 |
| 3,612,247 | 10/1971 | Pipp | 198/781 |
| 3,612,248 | 10/1971 | Wallis | 198/781 |
| 3,716,129 | 2/1973 | Sadler, Jr. | 198/781 |
| 3,718,248 | 2/1973 | Muller | 198/781 |
| 3,724,642 | 4/1973 | DeGood | 198/781 |
| 3,768,630 | 10/1973 | Inwood et al. | 198/781 |
| 3,770,102 | 11/1973 | DeGood | 198/781 |
| 3,840,110 | 10/1974 | Molt | 198/781 |
| 3,860,106 | 1/1975 | Cooley | 198/781 |
| 3,871,511 | 3/1975 | Wentz et al. | 198/470 |
| 4,088,224 | 5/1978 | Kittredge | 198/790 |
| 4,096,942 | 6/1978 | Shepherd | 198/790 |
| 4,108,303 | 8/1978 | Vogt et al. | 198/781 |
| 4,108,304 | 8/1978 | McKnight et al. | 198/781 |
| 4,109,783 | 8/1978 | Vogt | 198/781 |
| 4,174,777 | 11/1979 | Riehle | 198/781 |
| 4,219,115 | 8/1980 | Moore | 198/781 |
| 4,238,029 | 12/1980 | Pirro | 198/781 |
| 4,264,004 | 4/1981 | Harwick | 198/781 |
| 4,273,239 | 6/1981 | Thwaites et al. | 198/781 |
| 4,278,166 | 7/1981 | Pirro, Jr. | 198/781 |
| 4,311,231 | 1/1982 | Milazzo | 198/781 |
| 4,344,527 | 8/1982 | Vogt et al. | 198/781 |
| 4,383,605 | 5/1983 | Harwick | 198/781 |
| 4,392,568 | 7/1983 | Turnbough et al. | 198/781 |
| 4,453,627 | 6/1984 | Wilkins | 198/781 |
| 4,461,382 | 7/1984 | Hoover et al. | 198/781 |
| 4,473,149 | 9/1984 | Vogt et al. | 198/781 |
| 4,534,462 | 8/1985 | Hoover et al. | 198/781 |
| 4,562,920 | 1/1986 | Jaffre | 198/781 |

Primary Examiner—James A. Leppink
Assistant Examiner—Matthew Smith
Attorney, Agent, or Firm—Sperry, Zoda & Kane

[57] ABSTRACT

A powered accumulating conveyor apparaus is disclosed which may be pneumatically controlled to define a plurality of conveying stations therein. Each of the conveying stations or zones being separately operable to be in the conveying mode responsive to the simultaneous receiving of a pilot signal from the immediate downstream conveyor therefrom and to receiving a loaded signal. A drive configuration is included having a drive belt selectively engageable with respect to driven rollers separated from one another by idling rollers. The drive belt is maintained in contact with the driven rollers and can be removed from contact to halt driving thereof by rotation of a cam-like brake member in such a manner as to force an abutment edge in contact with the driven rollers to cease movement thereof and to remove contact of the drive belt therewith.

12 Claims, 3 Drawing Figures

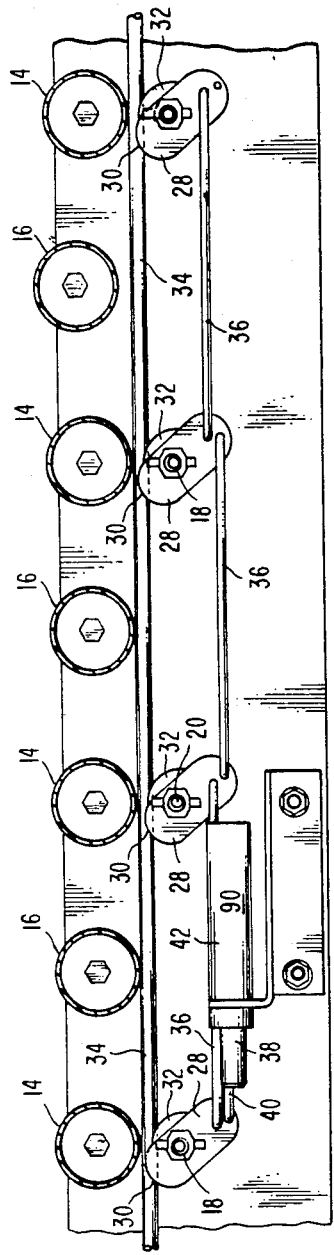
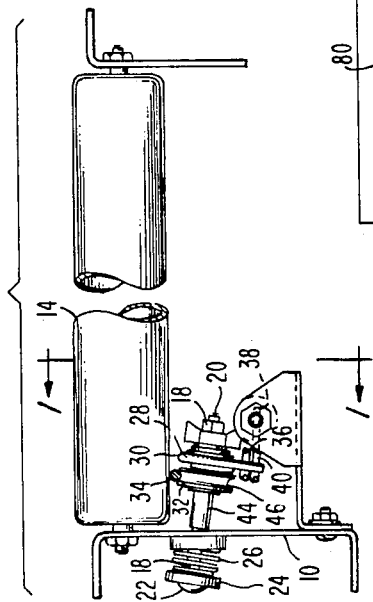
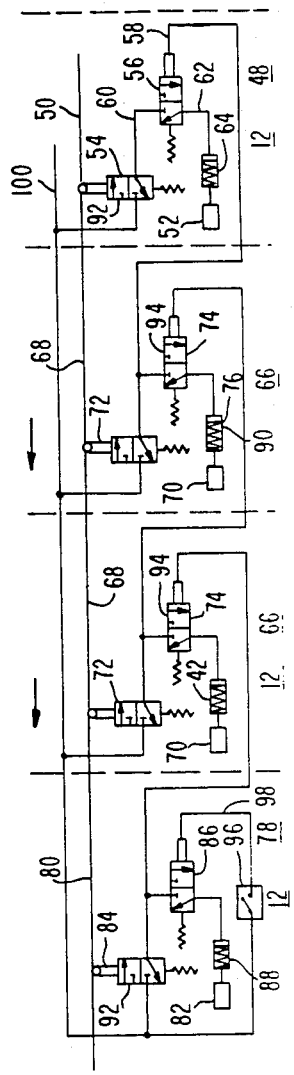

POWERED ACCUMULATING CONVEYOR APPARATUS

BACKGROUND OF THE INVENTION

1. Field of the Invention

The present invention deals with the field of means for conveying of articles and for controlling the accumulating of articles within prespecified zones within a system. This type of arrangement is particularly usable for supplying various amounts of load selectively or continuously to a location while at the same time preventing overloading of the conveyor adjacent to the off loading station.

2. Description of the Prior Art

Prior art configurations utilize various interlocking systems between zones. However, none of these interlocking control systems make use of the control logic nor the specific hardware set forth in the present invention. Examples of prior art pertaining to the current field of this invention include U.S. Pat. Nos. 1,728,538 issued to E. Gentil et al; 3,323,636 issued to Gotham; 3,612,247 issued to Pipp; 3,612,248 issued to Wallis; 4,088,224 issued to Kittredge; 4,108,303 issued to Vogt et al; 4,108,304 issued to McKnight et al; 4,109,783 issued to Vogt; 4,174,777 issued to Riehle; 4,238,029 issued to Pirro, Jr.; 4,273,239 issued to Thwaites et al; 4,311,231 issued to Milazzo; 4,344,527 issued to Vogt et al; 4,392,568 issued to Turnbough et al; 4,453,627 issued to Wilkins; 4,461,382 issued to Hoover et al; 3,860,106 issued to Cooley; 3,840,110 issued to Molt et al; 3,724,642 issued to DeGood; 4,096,942 issued to Shepherd; 4,473,149 issued to Vogt et al; 4,534,462 issued to Hoover et al; 4,562,920 issued to Jaffre; and 4,383,605 issued to Harwick.

SUMMARY OF THE INVENTION

The present invention provides a powered accumulating conveyor apparatus having a plurality of conveying zones therein usually adjacently positioned with respect to one another to form an overall accumulating conveyor design.

Each zone includes a plurality of conveying rollers therein which are rotatably mounted with respect to the housing in which each of the zones is movably mounted with respect to. The conveying rollers are in spaced relation extending generally horizontally with respect to one another. A plurality of idler rollers are mounted with respect to the housing and are freely rotatable with respect thereto. These idler rollers are preferably positioned between the conveying rollers and extend horizontally parallel with respect thereto.

A plurality of mounting studs are movably mounted extending through the housing immediately below each of the conveying rollers. One end of the mounting stud is positioned adjacent to the conveying roller and the second end thereof is positioned on the opposite side of the housing with respect to the conveying roller. A retaining member is fixedly secured with respect to the second end of the mounting stud in such a manner as to retain a biasing means such as a spring or the like fixedly mounted between the housing and the retaining means for maintaining the mounting stud in the generally horizontally extending orientation.

A camming means is pivotally mounted with respect to the mounting stud and includes an abutment edge extending outwardly therefrom toward the conveying roller means which is located immediately thereadjacent. An abutment roller means is rotatably mounted about the mounting stud means and is adjacent to one of the conveying rollers. A drive belt is positioned preferably between the abutment roller and the conveying roller and is longitudinally movable therealong. The drive belt is in abutment with respect to the conveying roller and with respect to the abutment roller to allow frictional driving of the conveying roller responsive to longitudinal movement of the drive belt. This configuration provides the main driving of the driven rollers within a given conveying zone.

Connecting links are positioned and attached, with respect to the adjacent camming means, within a particular conveying zone and are movable to selectively cause simultaneous movement of each of the camming means within that zone in a similar manner. This movement can urge the abutment edges against the conveying roller means to move the mounting studs and the biasing rollers and the drive belt means away from the conveying roller to thereby cease driving movement thereof. In this position rotational movement of the conveying roller will be prevented by the frictional engagement of the conveying roller with respect to the abutment edge of the camming means. A drive member is also fixedly connected to one of the camming means and is operative responsive to being actuated to move the camming means and the connecting link members to the disengaged position with the abutment edges thereof in abutting contact with respect to the conveying rollers to thereby cease conveying within the prespecified zone.

It is also preferable to have a drive link extending between the drive member and the camming means to provide the capability for movement of the camming means between the engaged position preventing movement of the conveying roller means within the zone and the disengaged position which allows movement of the conveying roller means within the specific zone.

The drive member preferably will comprise a pneumatic air cylinder which is movable between an energized and a nonenergized position to control movement of the drive link. Also preferably the abutment roller is rotatably mounted about the mounting stud between the camming means and the housing means and is located adjacent to the camming means. To maintain spacing of the abutment roller with respect to the housing, a collar may be included cylindrically extending about the stud between the housing and the abutment roller to maintain a spaced relationship therebetween.

The abutment roller preferably will define a peripheral groove about the outermost circumference thereof to facilitate retaining of the drive belt means therein. The conveying roller and the idler roller as well as the abutment roller are all preferably made of metal but could be of any material.

Within the present invention the accumulating conveying apparatus is divided into three larger areas, a first conveying zone, at least one intermediate conveying zone and a final conveying zone. In normal configurations the first conveying zone and the final conveying zone will each be merely a single zone whereas the intermediate conveying zone can comprise a plurality of individual zones depending upon the length of the conveyor being used for the specific application.

The first conveying zone will be positioned at the upstream end of the powered accumulating conveyor and will be adapted to initially receive articles to be carried. This first conveying zone includes a first conveying means and a first conveyor drive means adapted to selectively disengage the first conveying means to cause operation thereof. A first load sensing means is also included within the first conveying zone and normally generates an unloaded signal as well as being responsive to the presence of an article within the first conveying zone to generate a loaded signal. A first valve means is normally operable to generate a disengagement signal and is responsive during the receiving of the loaded signal from the first load sensing means, simultaneously with the receiving of a pilot signal from the adjacent downstream zone to generate a drive stop signal.

A first drive control member is operative to control the first conveyor driving means and is normally in the drive mode and is responsive during the receiving of the drive stop signal from the first valve means to control the cease operation of the first conveyor driving means.

A plurality of intermediate conveying zones are adapted to as a unit receive articles from the first conveying zone to be carried along the individual zones of the intermediate conveying zone. Each intermediate conveying zone includes an intermediate conveying means to receive conveyed articles from the immediately upstream adjacent zone. Each intermediate conveying zone also includes an intermediate conveyor driving means selectively engageable with respect to the intermediate conveying means to cause operation thereof. An intermediate load sensing means is positioned within or adjacent to each intermediate conveying zone to normally generate an unloaded signal but is also responsive to the presence of an article within the associated zone to generate a loaded signal as well as a pilot signal therefrom.

An intermediate valve means is further included which is normally operable to generate a drive signal. This intermediate valve means is responsive during the simultaneous receiving of a loaded signal from the intermediate load sensing means and the pilot signal from the adjacent downstream zone to thereby generate a drive stop signal. Each intermediate conveying zone also includes an intermediate drive control member which is operative to control the intermediate conveyor drive. This intermediate drive control member is normally in the drive mode and is responsive during the receiving of a drive stop signal from the intermediate valve to controllably cease operation of the intermediate conveyor drive.

A final conveying zone is positioned at the most downstream location and is adapted to receive articles conveyed from the intermediate conveying zones. This final conveying zone may include a final conveying means adapted to selectively convey articles provided thereto. Also the final conveying zone includes a final conveyor drive selectively engageable with respect to the final conveying means to selectively cause conveying operation thereof. A final load sensing means is normally in a position to generate an unloaded signal and is responsive to the presence of an article within the final conveying zone to generate a loaded signal and a pilot signal therefrom. A final valve means is also defined within the final zone which is normally operable to generate a drive signal. The final valve is responsive during the receiving of a loaded signal from the final load sensing means to generate a drive stop signal. A final drive control member is operative to control the final conveyor drive and is normally in the drive mode and is responsive during the receiving of a drive stop signal from the final valve means to control the cease operation of the final conveyor driving means.

Preferably the load sensing means will comprise a normally closed pneumatic sensing apparatus. It is also preferable that three-way pilot operated valves or AND valves will provide the first, intermediate and final valve means.

A switch may be included in order to generate a pilot signal to the valve means of the final zone such that conveying thereof can be manually operated as desired.

It is an object of the present invention to provide a powered accumulating conveyor apparatus wherein pneumatic control means are utilized for preventing overloading of an accumulating conveyor apparatus.

It is an object of the present invention to provide a powered accumulating conveyor apparatus wherein a condition of no pneumatic signal operates rather than ceases operation of the conveying apparatus.

It is an object of the present invention to provide a powered accumulating conveyor apparatus wherein a separate pilot signal is generated by the immediate downstream zone to the operating zone to determine whether it is in the operating or non-operating mode.

It is an object of the present invention to provide a powered accumulating conveyor apparatus wherein a failure of air supply would still allow operation and dumping of what is already on the conveyor.

It is an object of the present invention to provide a powered accumulating conveyor apparatus wherein a separate manually or remotely operated pilot signal will control operation of the final accumulating zone.

It is an object of the present invention to provide a powered accumulating conveyor apparatus wherein a load sensing apparatus is positioned within or adjacent to each conveying zone which is normally closed and becomes open responsive to the sensing of a load.

It is an object of the present invention to provide a powered accumulating conveyor apparatus wherein each zone includes a valve means associated therewith which must receive an open signal from a load sensing means and a pilot signal from a downstream zone in order to cease operation of the drive means associated therewith.

It is an object of the present invention to provide a powered accumulating conveyor apparatus wherein each zone includes "AND" valve means therein which must receive an open signal from a load sensing means and a pilot signal from a downstream zone in order to cease operation of the drive means associated therewith.

It is an object of the present invention to provide a powered accumulating conveyor apparatus wherein a plurality of camming members are selectively engageable with respect to driven rollers to cease operation thereof responsive to certain predetermined conditions.

It is an object of the present invention to provide a powered accumulating conveyor apparatus wherein a drive belt means is positioned between an abutment roller configuration and conveying rollers to selectively activate cease driving movement of the driven rollers.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side section view of an embodiment of the powered accumulating conveyor apparatus of the present invention;

FIG. 2 is an end view of a driven roller showing the biasing and camming apparatus of an embodiment of the present invention; and FIG. 3 is a schematic illustration of an embodiment of a drive control apparatus usable for the present invention.

DETAILED DESCRIPTION OF THE PREFERRED EMBODIMENT

The present invention provides a powered accumulating conveyor apparatus which may include a housing 10 defining a plurality of conveying zones 12 therein. Each conveying zone 12 preferably includes a conveying roller means 14 and preferably a plurality of such conveying rollers. A plurality of idler roller means 16 may be positioned within each conveying zone 12 preferably at positions between adjacent pairs of conveying roller means 14 to facilitate supporting of articles being carried thereon.

A mounting stud means 18 is preferably positioned approximately horizontally extending through the housing means 10. A first end 20 of the mounting stud means is positioned extending inwardly below conveying roller 14. On the other hand the second end 22 is positioned outwardly with respect to housing 10 on the opposite side thereof from the location of rollers 14 or rollers 16.

Second end 22 preferably includes a retaining means 24 secured thereto to fixedly retain a biasing means which is a spring 26 between the second end 22 and housing means 10. The spring means 26 will have one end thereof in abutment with respect to the housing 10 and the other end thereof in abutment with respect to retaining means 24 to retain the mounting stud means 18 in the horizontal orientation.

A camming means 28 is preferably mounted about stud 18 in such a manner as to be rotatable therearound. Camming means 28 includes an abutment edge 30 extending outwardly therefrom which is adapted to selectively be engageable with respect to the conveying rollers 14 to selectively stop rotation thereof. An abutment roller means 32 is rotatably mounted upon the stud means between the housing 10 and the camming means 28 in such a manner as to retain a drive belt means 34 about the outer peripheral area thereof. To facilitate engagement of the drive belt means with respect to the outer peripheral area of abutment rollers 32, a groove means 46 may be defined peripherally around the outermost edge thereof. In this manner the drive belt means 34 which is preferably a plastic covered metallic cable will maintain securement with the outer edge of the abutment roller 32. Movement of the camming means 28 within a specific zone should be linked with respect to one another by way of a plurality of connecting link members 36. These link members secure adjacent camming means 28 within a specific zone with respect to one another such that they are movable in unison with respect to one another. A drive member 38 operatively connected to a drive link 40 will selectively cause this uniform movement. This is provided by drive link 40 being secured with respect to one of the camming means 28 in such a manner that the interconnection achieved by connecting link members 36 within a zone will cause simultaneous movement of camming means 28 therein responsive to actuation of drive member 38.

Preferably the drive member 38 will take the form of a pneumatic air cylinder 42.

The abutment roller means 32 will be maintained in spaced relation to the housing 10 by way of a collar means 44. Collar means will maintain a spaced relation by being larger than the rotational opening within roller 32.

A first conveying zone 48 will be defined adjacent to the supply of articles to be conveyed upon the present system. First conveying zone 48 will include a first conveying means 50 therein as well as a first conveyor driving means 52. A first load sensing means 54 will be located therein for providing a pneumatic signal responsive to a load or a predetermined amount of load being positioned within the first conveying zone 48. A first valve means 56 will be positioned within the first conveying zone 48 such that upon simultaneous receiving of a signal from first pilot line 58 and first load line 60 driving of the first conveyor means 52 will be halted. First load line 60 is operatively connected to the first load sensing means 54 and will only have a pneumatic signal passed therethrough when a load is indeed sensed within first conveying means 50. First pilot line 58 is connected to the zone immediately downstream from the first conveying zone 48 and will generate a signal only when the immediately downstream zone is also loaded. A first drive line is operatively secured from the output of the first valve means 56 to selectively initiate operation of the first drive control member 64 responsive to actuation of the first drive means 56 to thereby cease operation of the first conveying means 50 within that zone.

A plurality of intermediate conveying zones 66 may also be included within the present invention. There can be one such intermediate conveying zone or there can be a multiplicity of such zones, however, there is at least one intermediate conveying zone positioned between the first conveying zone 48 and the final conveying zone 78.

Intermediate conveying zone 66 includes an intermediate conveying means 68 therein to selectively cause operation of the conveyor therein for moving articles therealong. An intermediate conveyor driving means 70 is also included within each of the intermediate conveying zones 66 to selectively control operation of the intermediate conveying means 68.

An intermediate load sensing means 72 is positioned within each of the intermediate conveying zones 66 to sense whether a predetermined amount of load exists within the specific zone or not. Also an intermediate valve means is positioned within the intermediate conveying zone to selectively control the movement of the intermediate drive control member 76 located therein. This intermediate drive control member selectively causes halting or initiation of contact between the drive belt means 34 and the conveying roller means 14 to thereby allow or prevent rotational driving thereof.

A final conveying zone 78 includes a final conveying means 80 therein as well as a final conveyor driving means 82 therein. The final driving means 82 controls the final conveying means 80. A final load sensing means 84 will be normally closed but will initiate a pneumatic signal responsive to a predetermined load existing within the final conveying zone. A final valve means 86 will be defined within the final conveying zone 78 to operatively control a final drive control member 88. Final valve means 86 will be operative upon receiving of a signal from the final load sensing means simultaneously with the receiving of a signal from the final pilot switch 96 to initiate accumulation within the final conveying zone 78.

Each of the valve means including the final valve means 86, the first valve means 56 and the plurality of intermediate valve means 74 will preferably be normally closed three-way pilot actuated valves 94 such that signals must be received along the pilot line as well as along the respective load sensing line in order to cease driving of the conveyor within that specific zone. Preferably the final drive control member 88 as well as the first drive control member 64 as well as each of the intermediate drive control members 76 will comprise spring loaded pneumatic cylinders 90 to effectively control operation and movement of the drive link 40 for control of driving or non-driving within the associated zones.

Further preferably each of the intermediate load sensing means 72 as well as the first load sensing means 54 and the final load sensing means 84 will comprise a normally closed pneumatic sensing means 92. These sensing means 92 may be configured in any manner desirable such that when a predetermined amount of load is located within a station or zone a signal will be generated.

The final pilot switch 96 may be manual or remote and is connected through a final line 98 to the point of input of a pilot signal into the final valve means 86. In this manner the pilot signal associated with the final conveying zone 78 will be manually operated by the operator in control of this most downstream conveying location.

All of the pneumatic controls of the present invention can be simultaneously operated off of a pneumatic supply line 100 providing power to all of the load sensing means as well as all of the valve control means and spring loaded air cylinders.

In operation of the present invention all of the intermediate conveying zones 66 as well as the first conveying zone 48 will be allowed to remain in the conveying mode unless both the specific zone as well as the immediately downstream zone is sensing a fully loaded condition. Thus with an empty conveyor as articles are placed upon the first conveying zone 48, they will be continuously conveyed through each successive zone until they reach the final conveying zone 78. The operator will maintain the final pilot switch 96 either manually or by remote control in the closed condition in order to keep the final zone conveying. Once the final zone 78 is loaded, the final load sensing means 84 will be depressed halting the upper signal from being communicated to the final valve means 86 through the load line to allow cessation of driving of the final conveying means 80.

With the final conveying zone 78 being in the fully loaded condition a signal will be generated into the pilot input location of intermediate valve means 74. That is, the signal will be generated into the most downstream intermediate conveying zone. This signal will not prevent operation of the conveyor within this intermediate zone until intermediate load sensing means 72 is depressed by that zone being loaded. Thus the simultaneous loading of the intermediate conveying load and the final conveying zone will actuate valve means 74 causing actuation of pneumatic air cylinder 42 within the intermediate zone to cease operation of conveying therein. This will then successfully occur at each upstream location until all of the intermediate conveying zones as well as the first conveying zone 78 are allowed to accumulate to a loaded condition. In this manner the powered accumulating conveyor apparatus of the present invention will achieve a fully loaded condition. Under this condition if a pneumatic failure occurs, the conveyor will be capable of unloading which is a distinct advantage over prior art devices where the pneumatic signal is necessary in order to achieve conveying.

Once the operator has unloaded the final conveying zone 78, a signal will no longer be generated by final load sensing means 84. In this manner the final valve means 86 will generate a signal to final drive control member 88 to initiate operation of drive of the final conveying means 80 located therein. Simultaneously the input at the pilot location of intermediate valve means 74 will be halted. Thus since valve 74 does not receive the signal, a pilot signal simultaneously with the receiving of the loaded signal from sensing means 72, operation of the drive means within the intermediate zone will also be initiated. This will occur successively as the most downstream intermediate zone dumps into the final zone and each intermediate zone dumps into the next adjacent downstream intermediate zone therefrom. Finally the first conveying zone will dump into the uppermost intermediate conveying zone and the first conveying zone will be adapted if necessary to receive additional loading.

In this manner the operation of the entire apparatus is achieved in a controlled manner. Also the loss of pneumatic signal will still allow conveying contrary to most other prior art systems.

Operation within a specific zone is achieved by a spring loaded pneumatic cylinder 90 being movable between a driving mode and a non-driving mode. A drive member 38 is movable therein to control operable location of drive link 40. With connecting link members 36 secured between each adjacent camming means within a specific zone, movement of the drive member 38 will selectively cause simultaneous movement of each of the camming means. The camming means are each located adjacent to one of the conveying rollers 14 and are movable to the non-driving mode to allow the abutment edge 30 of each camming means to simultaneously engage the conveying rollers 14.

On the other hand, in the driving mode the abutment rollers 32 will each be rotatably mounted about the stud means 18 in such a manner as to urge the drive belt means 34 positioned within the slot defined peripherally around the abutment roller 32 to be in contact with the driven rollers 14 for powering thereof. The optional individual idler rollers 16 positioned within each conveying zone will have complete freedom of rotational movement and will not be driven and thereby also will not require any means for the cessation of driving thereof. These rollers 16 will provide additional support between the driven rollers 14.

The individual load sensing means such as first load sensing means 54, final load sensing means 84 and the plurality of intermediate load sensing means 72 may be positioned within the zone associated therewith or within an adjacent zone. When the load sensing means is positioned in the adjacent downstream zone with respect to its associated zone, a slight increase of packing will occur. However, on the other hand when the load sensing means is positioned in the immediately adjacent zone with respect to its associated zone, a significant amount of increase in packing density upon the conveyor will be achieved. These are two alternative configurations to having a load sensing means sense a load directly in the zone to which it is associated.

Powered zones need not be adjacent to one another. They can be separated by sections which are continuously powered and are not capable of ceasing operation other than by manual or other remote depowering. One example might be an arc or curve in the line wherein the portion of the line which is arcuate would be constantly powered and would not be subject to singulation. In this configuration, the schematic in FIG. 3 would assume that the last conveying zone being capable of being actuated or deactuated prior to entering into the curve, would be schematically adjacent to the first conveying zone after the curve in the line. In this configuration problems normally associated with such arcuate portions of the line will not be encountered.

One of the prime advantages of the present invention is the capability to dump all articles on the powered accummulating conveyor apparatus in slug fashion. That is a constant conveyance of all articles simultaneously to empty the conveyor. Alternatively with the pneumatic control system powered, the power accumulating. conveyor apparatus can singulate out each zone separately ahd provide an alternative manner of dumping of all the articles currently on the conveyor in a slower but more controlled manner.

The various valve means including the first valve means 56, the final valve means 86 and the plurality of intermediate valve means 74 can be remotely located from the associated zone. In a preferred configuration all of the valve means can be located in a single control zone with pneumatic signaling communication to each of the zones associated with each individual valve means. Since these valve means are merely controlling mechanisms there is no necessity that they actually be located within the specific associated zone area.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A powered accumulating conveyor apparatus comprising:
    (a) a housing means;
    (b) a plurality of conveying zones being positioned adjacent to one another to form an accumulating conveyor, each of said conveying zones including;
        (1) a plurality of conveying roller means rotatably mounted with respect to said housing means, said conveying roller means being in spaced relation extending horizontally parallel with respect to one another;
        (2) a plurality of mounting stud means movably mounted extending through said housing immediately below each of said conveying rollers means, each of said mounting stud means including a first end thereof adjacent said conveying roller means and a second end thereof on the opposite side of said housing with respect to said conveying roller means;
        (3) a retaining means fixedly secured with respect to each of said second end of said mounting stud means;
        (4) a biasing means positioned between each of said retaining means and said housing means for biasing them away from one another;
        (5) a braking means pivotally mounted with respect to each of said mounting stud means, said braking means including an abutment edge extending outwardly therefrom toward said conveying roller means thereadjacent;
        (6) an abutment roller means rotatably mounted about said mounting stud means between said braking means and said housing means and adjacent to said braking means, said abutment roller means being adjacent to one of said conveying roller means;
        (7) a drive belt means positioned between said abutment roller means and said conveying roler means and being longitudinally movable with respect thereto, said drive belt means being in abutment with respect to said conveying roller means and with respect to said abutment roller means to allow frictional driving of said conveying roller means responsive to longitudinal movement of said drive belt means, said braking means being pivotally movable about said mounting stud means to simultaneously abut said conveying roller means and to selectively urge said drive belt means out of frictional engagement with respect to said conveying roller means;
        (8) a plurality of connecting link members attaching said braking means with respect to one another within a conveying zone and being movable to selectively cause simultaneous movement of each of said braking means and urge said abutment edges thereof against said conveying roler means to move said mounting stud means and said biasing roller secured thereto and said drive belt means away from said conveying roller means to cease driving thereof and to prevent rotational movement of said conveying roller means by frictional engagement with respect thereto; and
        (9) a drive member operatively connected to one of said braking means and responsive to being actuated to move said braking means and said connecting link members to the disengaged position with said abutment edge thereof in abutting contact with respect to said conveying roller means to halt conveying within the zone.

2. The apparatus as defined in claim 1 further comprising a drive link extending between said drive member and one of said braking means to move said braking means between the engaged position preventing movement of said conveying roller means within said zone and the disengaged position allowing movement of said conveying roller means within said zone.

3. The apparatus as defined in claim 1 wherein said drive member comprises a pneumatic air cylinder.

4. The apparatus as defined in claim 1 wherein said biasing means comprises a spring means positioned between said housing and said retaining means to movably retain said mounting stud means extending through said housing.

5. The apparatus as defined in claim 1 further comprising a collar means extending about said mounting stud means between said housing means and said abutment roller means to urge said abutment roller means to a position adjacent to said braking means.

6. The apparatus as defined in claim 1 wherein said abutment roller means defines a peripheral groove about the outermost circumference thereto to facilitate retainment of said drive belt means therein.

7. The apparatus as defined in claim 1 wherein said mounting stud means extend approximately horizontally through said housing.

8. The apparatus as defined in claim 1 wherein said drive belt means is approximately circular in cross-section.

9. The apparatus as defined in claim 1 wherein said drive belt means comprises a plastic-coated metal wire member.

10. The apparatus as defined in claim 1 wherein each of said conveying zones comprises a plurality of idler roller means mounted freely rotatable with respect to said housing means, said idler roller means being positioned between said conveying roller means and extending horizontally parallel with respect thereto.

11. The apparatus as defined in claim 10 wherein said conveying roller means and said idler roller means are made of metal.

12. The apparatus as defined in claim 10 wherein one or more of said idler roller means is positioned between each pair of said conveying roller means.

* * * * *